(12) United States Patent
Madsen et al.

(10) Patent No.: US 8,584,987 B2
(45) Date of Patent: Nov. 19, 2013

(54) SHAPE MEMORY ALLOY FAIRINGS

(75) Inventors: Casey Lyn Madsen, Normandy Park, WA (US); Daniel John Clingman, Milton, WA (US); James H. Mabe, Seattle, WA (US); Frederick Theodore Calkins, Renton, WA (US)

(73) Assignee: The Boeing Company, Chicago, IL (US)

( * ) Notice: Subject to any disclaimer, the term of this patent is extended or adjusted under 35 U.S.C. 154(b) by 145 days.

(21) Appl. No.: 13/102,503

(22) Filed: May 6, 2011

(65) Prior Publication Data

US 2012/0282474 A1 Nov. 8, 2012

(51) Int. Cl.
*B64C 1/38* (2006.01)

(52) U.S. Cl.
USPC .............................. 244/130; 89/1.54

(58) Field of Classification Search
USPC .................. 244/3.24, 130; 89/1.54, 1.58
See application file for complete search history.

(56) References Cited

U.S. PATENT DOCUMENTS

| | | | | |
|---|---|---|---|---|
| 2,852,981 A * | 9/1958 | Caya | ............................ | 89/1.58 |
| 3,115,059 A * | 12/1963 | Moul, Jr | ....................... | 89/1.819 |
| 3,153,980 A * | 10/1964 | Kongelbeck | ................. | 89/1.819 |
| 3,195,406 A * | 7/1965 | Toomey, Jr | .................. | 89/1.819 |
| 4,170,923 A * | 10/1979 | Kilmer | .......................... | 89/1.819 |
| 4,412,475 A * | 11/1983 | Hornby | ........................ | 89/1.816 |
| 4,874,145 A * | 10/1989 | Prentice | ....................... | 244/53 B |
| 5,056,408 A * | 10/1991 | Joner et al. | ..................... | 89/1.51 |
| 5,961,075 A * | 10/1999 | Russell, III | ................. | 244/137.4 |
| 6,212,987 B1 * | 4/2001 | Jakubowski et al. | .......... | 89/1.54 |
| 6,748,871 B2 * | 6/2004 | Hellman | ....................... | 102/490 |
| 6,813,877 B2 * | 11/2004 | Birch et al. | ................... | 60/226.1 |
| 6,923,123 B2 * | 8/2005 | Rastegar et al. | .............. | 102/400 |
| 7,255,044 B2 * | 8/2007 | Rastegar et al. | .............. | 102/400 |
| 7,503,525 B1 * | 3/2009 | Lam et al. | ................... | 244/137.4 |
| 7,578,132 B2 * | 8/2009 | Webster | .......................... | 60/770 |
| 7,587,899 B2 * | 9/2009 | Song et al. | ...................... | 60/771 |
| 7,685,918 B2 * | 3/2010 | Bar-on et al. | ................... | 89/1.54 |
| 8,038,923 B2 * | 10/2011 | Berger et al. | ................. | 264/313 |
| 8,042,305 B2 * | 10/2011 | Pryor et al. | ..................... | 52/121 |
| 8,058,595 B2 * | 11/2011 | Koehler et al. | ................ | 244/3.1 |

(Continued)

OTHER PUBLICATIONS

Mabe et al.,; "Boeing's Variable Geometry Chevron, Morphing Aerostructure for Jet Noise Reduction"; AIAA 2006-2142 ; 47th AIAA/ASME/ASCE/AHS/ASC Structures, Structural Dynamics, and Materials Conference, May 1-4, 2006.

(Continued)

*Primary Examiner* — Benjamin P Lee
(74) *Attorney, Agent, or Firm* — Hope Baldauff, LLC

(57) ABSTRACT

Concepts and technologies are disclosed herein for shape memory alloy weapon fairings. The shape memory alloy weapon fairings are formed from a shape memory alloy and are configured to change shape in response to temperature changes. At a first temperature, the shape memory alloy weapon fairing has a first shape and at a second temperature, the shape memory alloy has a second shape. Upon deployment of a weapon including the shape memory alloy weapon fairing, the shape memory alloy weapon fairing is heated by the weapon and/or air friction. The shape memory alloy weapon fairing changes shape in response to the temperature change and provides a fairing for one or more structures of the weapon. In some implementations, the fairing covers a protuberance or other connection mechanism of the weapon.

20 Claims, 5 Drawing Sheets

(56) References Cited

U.S. PATENT DOCUMENTS

| | | | |
|---|---|---|---|
| 2003/0047645 A1* | 3/2003 | Rastegar et al. | 244/3.24 |
| 2005/0133661 A1* | 6/2005 | Rastegar et al. | 244/3.24 |
| 2005/0133668 A1* | 6/2005 | Rastegar et al. | 244/130 |
| 2006/0000211 A1* | 1/2006 | Webster | 60/527 |
| 2007/0138341 A1* | 6/2007 | Joshi et al. | 244/129.1 |
| 2009/0283936 A1* | 11/2009 | Sanderson et al. | 264/413 |
| 2009/0314890 A1* | 12/2009 | Koehler et al. | 244/119 |
| 2010/0301159 A1* | 12/2010 | Schnitzer | 244/54 |
| 2011/0030380 A1* | 2/2011 | Widdle et al. | 60/771 |

OTHER PUBLICATIONS

Calkins et al.,; "Overview of Boeing's Shape Memory Alloy Based Morphing Aerostructures"; SMASIS2008-648: Proceedings of the ASME Conference on Smart Materials, Adaptive Structures and Intelligent Systems-2008, vol. 1, 2009; pp. 885-895.

International Search Report and Written Opinion dated Sep. 13, 2013 in international application No. PCT/US2012/032513.

Nowrich, Dennis W., "A Study of the Properties of a High Temperature Binary Nitinol Alloy Above and Below its Martensite to Austenite Transformation Temperature", 2010.

* cited by examiner

US 8,584,987 B2

SHAPE MEMORY ALLOY FAIRINGS

TECHNICAL FIELD

The present disclosure relates generally to fairings and, more particularly, to shape memory alloy fairings.

BACKGROUND

Fairings are structures often included in airborne structures to provide a smooth surface, or to redirect airflow, for reducing drag during flight. Fairings are sometimes included on aircraft, for example, at or near stabilizers, wings, various structure junctions, landing gear, flaps, fins, rudders, and other structures. Fairings are also used in other airborne structures such as rockets, space vehicles, and the like. In some applications, fairings are used to cover couplings or other connection points between deployable and/or configurable structures such as movable wings, flaps, vents, tanks, bombs, missiles, and the like.

Some deployable structures such as missiles and bombs, however, often do not include fairings due to space limitations and/or other considerations. With respect to air-to-air and/or air-to-ground weapons such as missiles and bombs, for example, a connection point is formed between a lug or other connection mechanisms on the weapon and a connection mechanism on the aircraft. After the weapon is deployed, the lug or other coupling structures on the weapon typically are exposed. These exposed connection mechanisms can create drag, thereby reducing speed, range, and/or other performance characteristics of the weapon.

As such, in some instances it may be desirable to provide a fairing or other structure for covering the connection mechanism and/or for diverting air around the exposed connection mechanism. Providing a fairing or other structure to reduce drag induced by exposed connection mechanisms that can move into place after deployment of the weapon can require numerous moving parts, power supplies, gears, and/or other mechanisms, thereby affecting an already weight-sensitive platform, further degrading performance of the weapon.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to one aspect, an airborne structure includes a support surface and a shape memory alloy fairing disposed adjacent to the support surface. The shape memory alloy fairing has a first shape at a first temperature and a second shape at a second temperature. In some embodiments, the shape memory alloy fairing is configured to provide a fairing for an attachment mechanism of the airborne structure at the second temperature and when having the second shape.

According to another aspect, a shape memory alloy weapon fairing includes an attachment surface configured to contact a support surface of a weapon. The shape memory alloy weapon fairing can be disposed adjacent to the support surface and can have a first shape at a first temperature and a second shape at a second temperature. The shape memory alloy weapon fairing is configured to provide a fairing for an attachment mechanism of the weapon at the second temperature and when having the second shape.

According to yet another aspect, a method for forming a shape memory alloy weapon fairing includes obtaining a shape memory alloy weapon fairing blank, the blank being configured in a first configuration. The method further includes deforming the blank via a first deformation process to obtain a second configuration of the blank, the second configuration of the blank corresponding to a shape of the shape memory alloy weapon fairing. The method further includes deforming the first shape to obtain a third configuration, the third configuration being substantially similar to the first configuration, and disposing the shape memory alloy weapon fairing blank to a weapon.

The features, functions, and advantages discussed herein can be achieved independently in various embodiments of the present invention or may be combined in yet other embodiments, further details of which can be seen with reference to the following description and drawings.

DETAILED DESCRIPTION

Figure 1:
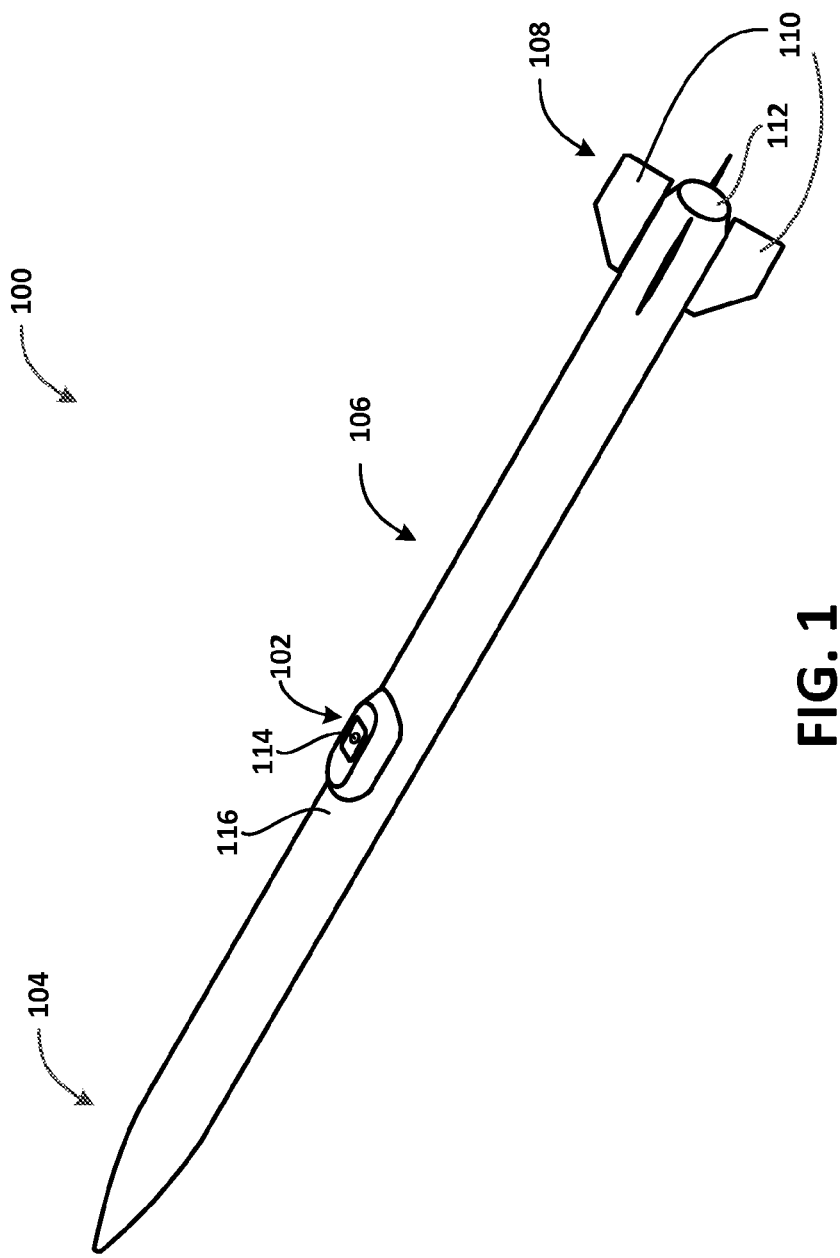
FIG. 1 is a perspective view of a weapon, according to an illustrative embodiment.

The following detailed description is directed to shape memory alloy weapon fairings. The shape memory alloy weapon fairings are formed from a shape memory alloy such as nitinol and are configured to cover a lug and/or other connection mechanisms formed on an airborne structure. As used herein and in the claims, the term "airborne structure" and variants thereof is used to refer to any aerodynamic vehicle or other structure including, but not limited to, aircraft, space vehicles, rockets, missiles, bombs, guided bombs, projectiles, other weapon systems, sonic, subsonic, supersonic, and hypersonic projectiles and/or vehicles, and/or similar structures. The shape memory alloy weapon fairing also can be used in conjunction with non-airborne structures such as high-speed land vehicles and/or other structures, though these embodiments are not illustrated in the FIGURES for the sake of brevity. In various embodiments described herein, the shape memory alloy weapon fairings are configured for use on weapons such as missiles and bombs.

The shape memory alloy weapon fairings are configured in a pre-deployment shape and attached or connected to a support surface of the weapon or other structure. In some embodiments, the support surface includes the skin of a weapon, an outer surface of another airborne structure, or the like. Upon deployment of the weapon, the shape memory alloy weapon fairing is heated by dedicated or undedicated heat sources within the weapon and/or by air friction encountered by the weapon during flight. The internal heat source and/or heat generated by air friction can heat the shape memory alloy weapon fairing to or past a transition temperature, whereat the shape memory alloy weapon fairing changes shape to a deployment configuration. Thus, the shape memory alloy weapon fairing can be used to reduce drag associated with a weapon lug and/or other connection mechanisms without requiring moving mechanical parts, power sources, and/or other related structures. As such, performance of the weapon can be improved without adding a significant amount of weight to the weapon platform. These and other advantages and features will become apparent from the description of the various embodiments below.

In the following detailed description, references are made to the accompanying drawings that form a part hereof and that show, by way of illustration, specific embodiments or examples. In referring to the drawings, like numerals represent like elements throughout the several figures.

FIG. 1 schematically illustrates a weapon 100 incorporating a shape memory alloy weapon fairing 102, according to an illustrative embodiment. The weapon 100 can include, but is not limited to, various airborne structures such as missiles, bombs, guided bombs, rail gun projectiles, subsonic, sonic, and supersonic projectiles, ordnances, propelled grenades, other weapons, and the like. For purposes of illustrating and describing the concepts and technologies disclosed herein, the weapon 100 is illustrated as a missile. It should be understood that this embodiment is illustrative, and should not be construed as being limiting in any way.

The weapon 100 includes a front end 104. As is understood by one skilled in the art, the front end 104 can include various guidance systems such as an inertial reference unit ("IRU") or an inertial measurement unit ("IMU"), infrared sensors, armament sections such as warheads, a control section for controlling movement of various structures of the weapon 100, other structures and systems, and the like. During flight of the weapon 100, the front end 104 corresponds to a leading end of the weapon 100 and is the portion of the weapon 100 that first makes contact with a target (not illustrated) during an engagement.

The weapon 100 also includes a body 106. The body 106 can include various control systems, guidance systems, and/or armaments instead of, or in addition to, the front end 104. According to some implementations, the body 106 also includes propellant and/or an engine for propelling the weapon 100 toward a target upon deployment. Thus, the body 106 can include solid or liquid propellants and/or other materials and/or structures.

The weapon 100 also includes a tail end 108. The tail end 108 includes, but is not limited to, one or more wings or fins ("fins") 110, an engine outlet 112, and/or other structures, though this is not necessarily the case. The tail end 108 also can include other structures that are not illustrated for the sake of simplicity, such as connection mechanisms, vents, wings, canards, and the like. Similarly, though not shown in FIG. 1, the front end 104 and/or the body 106 can include canards, wings, and/or fins, if desired.

In the embodiment illustrated in FIG. 1, the shape memory alloy weapon fairing 102 covers a lug, umbilical connector, protuberance, and/or other connection mechanism ("lug") 114 of the weapon 100. The shape memory alloy weapon fairing 102 is illustrated in FIG. 1 in a deployed configuration, as will be described and illustrated in more detail below with reference to FIGS. 2A-4B. As such, it should be understood that the shape and configuration of the weapon 100 and the shape memory alloy weapon fairing 102 illustrated in FIG. 1 is illustrative and should not be construed as being limiting in any way.

As shown in FIG. 1, the shape memory alloy weapon fairing 102 can be connected or attached to a support surface 116 of the weapon 100. The support surface 116 can correspond, in various implementations, to an outer surface of an aircraft or other vehicle, to an outer skin of a missile, bomb, or other armament such as the weapon 100, and/or to other surfaces to which the shape memory alloy weapon fairing 102 is connected or attached. It therefore should be understood that the embodiment illustrated in FIG. 1 is illustrative, and should not be construed as being limiting in any way.

Figure 2A:
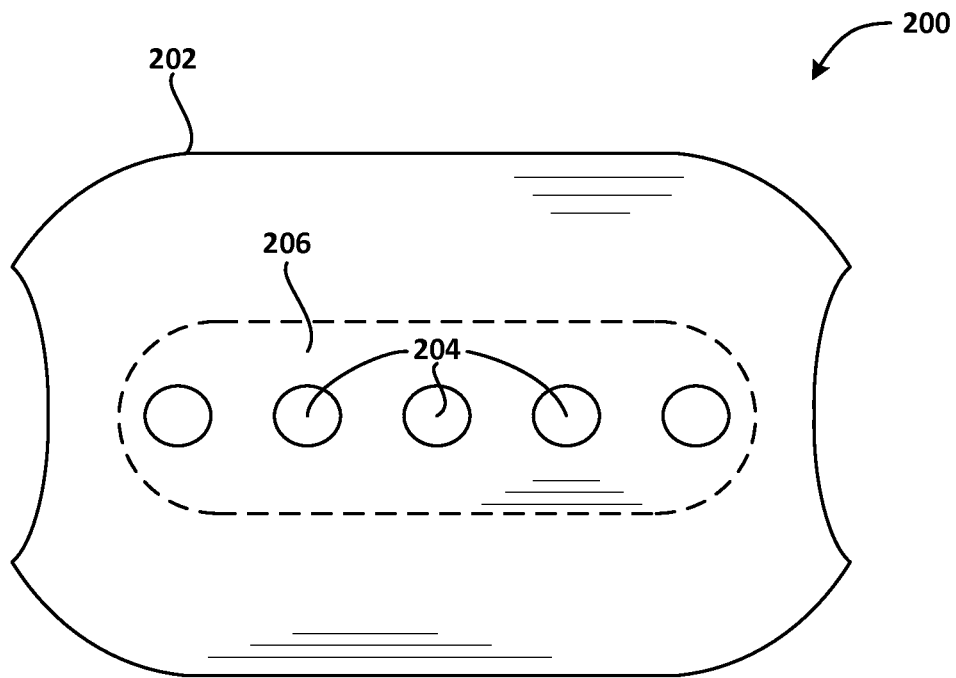
FIGS. 2A-2B are plan views illustrating aspects of a shape memory alloy weapon fairing in a pre-deployment configuration, according to an illustrative embodiment.
Figure 2B:

Turning now to FIGS. 2A and 2B, aspects of a shape memory alloy weapon fairing 102 are described in detail. In particular, FIGS. 2A and 2B are plan views of an illustrative shape memory alloy weapon fairing blank ("blank") 200 from which a shape memory alloy weapon fairing 102 can be formed, according to some illustrative embodiments. The blank 200 is formed, in various implementations, from a shape memory alloy, also referred to as smart metals, memory metals, memory alloys, smart alloys, and/or other terms and phrases. In various embodiments, the blank 200 is formed from as sheet of nitinol, though various other shape memory alloys of copper, zinc, aluminum, nickel, titanium, palladium, and/or other materials can be used as well. The choice of material for the blank 200 can be made based upon various design considerations such as operating temperature ranges, desired transition temperatures, desired transition times, combinations thereof, and the like.

More particularly, in some embodiments, the blank 200 is formed from binary nitinol. In one illustrative embodiment, the blank 200 is formed from "nitinol 55," a binary form of nitinol that is 55% by weight nickel. It should be understood that this embodiment is illustrative, and should not be construed as being limiting in any way. For example, in some contemplated embodiments, the blank 200 is formed from one or more alloys, wherein in one or more of the alloys are shape memory alloys and wherein one or more of the alloys are not shape memory alloys such as steel, brass, and the like. As such, it will be understood that the blank 200 can be formed from a combination of materials and/or alloys such that the various portions or regions of the blank 200 react to different transition temperatures and/or transition at different times relative to other portions or regions of the blank 200. These and other embodiments are described in more detail herein.

The blank 200 shown in FIG. 2A includes an edge 202 for defining an outer shape of the shape memory alloy weapon fairing 102. The edge 202 also can correspond to an attachment surface of a shape memory alloy weapon fairing 102 that contacts the weapon 100 when attached to weapon 100. The blank 200 also includes, in some embodiments, one or more apertures 204, which are described in more detail below with reference to FIGS. 3 and 5. Briefly, the apertures 204 can be used as guides during forming of the shape memory alloy weapon fairing 102 and/or to provide one or more through holes via which the weapon 100 is connected to an aircraft and/or other platform. The apertures 204 can serve additional or alternative functions and/or can be omitted, if desired. As such, the illustrated embodiment should be understood as being illustrative, and should not be construed as being limiting in any way.

The blank 200 also includes a top portion 206. While the top portion 206 corresponds in FIG. 2A to a portion of the blank 200, the top portion 206 can be configured to provide a tiered portion of the shape memory alloy weapon fairing 102 when in the deployed configuration, as will be illustrated and described in more detail below with reference to FIGS. 4A and 4B. As will be appreciated with additional reference to FIG. 2B, the blank 200 can be flat before forming and in when configured in a pre-deployment configuration, as will be described herein in more detail.

Figure 3:
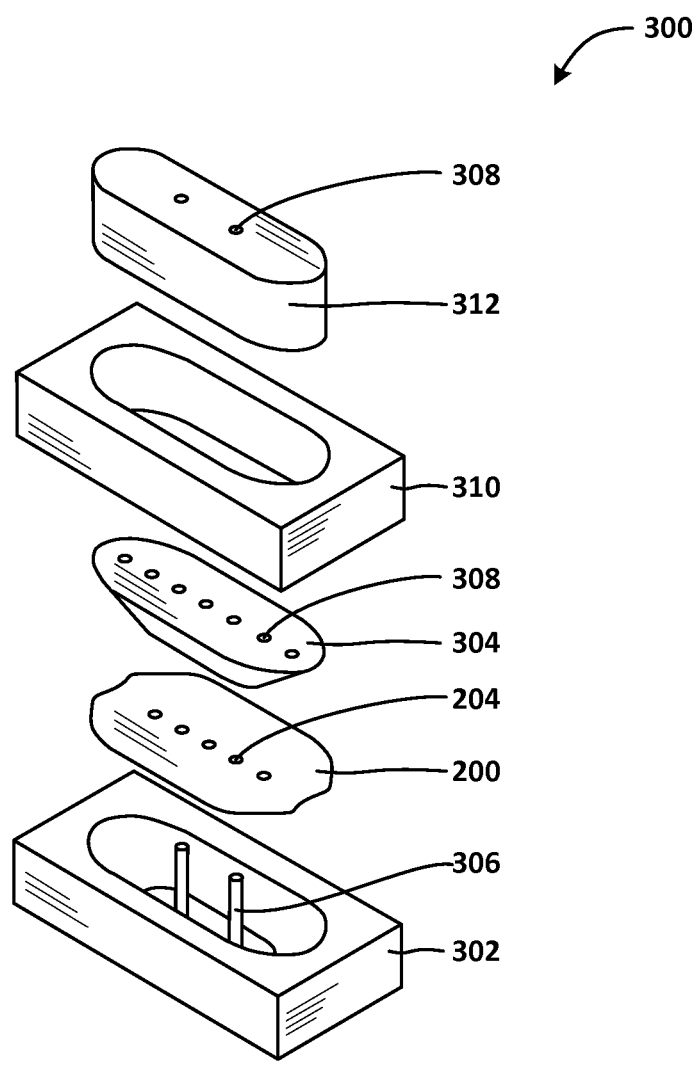
FIG. 3 is a perspective view of a tool and die for forming a shape memory alloy weapon fairing, according to an illustrative embodiment.

Turning now to FIG. 3, additional aspects of the shape memory alloy weapon fairing 102 are described in detail, according to an illustrative embodiment. More particularly, FIG. 3 illustrates a perspective view of a tool and die set 300 for forming the shape memory alloy weapon fairing 102, according to some embodiments. As shown, the tool and die set 300 can include a mold or tool ("mold") 302 and a die 304.

The mold 302 can, but does not necessarily, include one or more guide rods 306 for use during forming of a part, corresponding in the illustrated embodiment to a shape memory alloy weapon fairing 102. More particularly, the apertures 204 of the blank 200 can be passed over the guide rods 306, and the die 304 can have corresponding apertures 308 that are passed over the guide rods 306 to guide the die 304 into a seated position with the mold 302. It will be appreciated that a forming process can be completed by driving the die 304 into the seated position with the mold 302 and by disposing the blank 200 between the die 304 and the mold 302.

As such, a forming process can be used to form the blank 200 into a part, corresponding in the illustrated embodiment to a shape memory alloy weapon fairing 102, that approximates the shape of the mold 302 and the die 304, as the mold 302 and the die 304 can have complimentary shapes. Furthermore, it should be understood that during a forming process such as that described above, various heat treatment processes can be completed, if desired to form a deployed shape and to thereby "store" the shape in the shape memory alloy. Forming shapes with shape memory alloys are generally understood and as such will not be described herein in additional detail. The deployed shape of the shape memory alloy weapon fairing 102 is illustrated and described below with reference to FIGS. 4A and 4B.

Figure 4A:
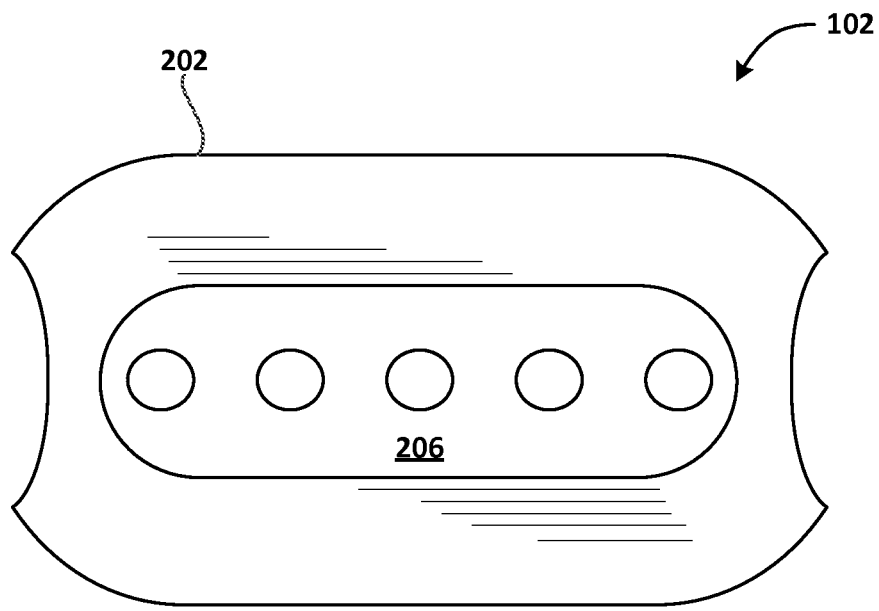
FIGS. 4A-4B are assembly drawings illustrating additional aspects of a shape memory alloy weapon fairing in a deployed configuration, according to an illustrative embodiment.
Figure 4B:
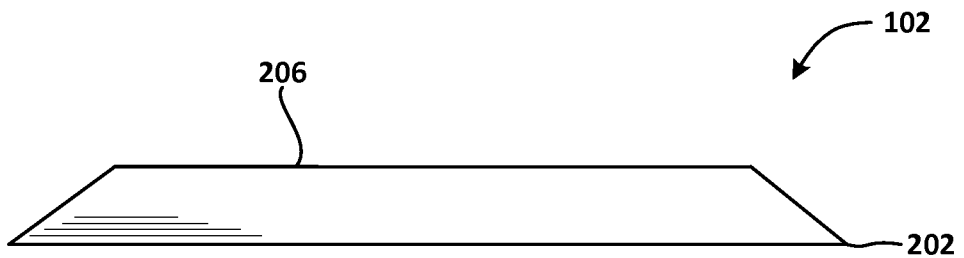

Turning now to FIGS. 4A and 4B, additional aspects of the shape memory alloy weapon fairing 102 are described in detail, according to an illustrative embodiment. In particular, FIG. 4A is a top plan view of the shape memory alloy weapon fairing 102 in a deployed configuration, and FIG. 4B is a front or rear plan view of the shape memory alloy weapon fairing 102 illustrated in FIG. 4A. As illustrated and described above with reference to FIGS. 1-3, the shape memory alloy weapon fairing 102 shown in FIGS. 4A and 4B can be formed from the blank 200 shown in FIG. 2 by a forming process such as a forming process utilizing the tool and die set 300 illustrated above in FIG. 3.

As shown in FIGS. 4A and 4B, the shape memory alloy weapon fairing 102 includes an edge 202 and a top portion 206. As discussed above, the top portion 206 can provide a tiered shape to the shape memory alloy weapon fairing 102. It can be appreciated with reference to FIGS. 1 and 4A-4B that the top portion 206 can be configured to provide a smooth surface around a lug 114 or other connection mechanism of the weapon 100. As such, the shape memory alloy weapon fairing 102 can be used to reduce drag associated with the lug 114 or other connection mechanism of the weapon 100, thereby improving range, speed, acceleration, trajectory, and/or other performance characteristics of the weapon 100.

According to various embodiments of the concepts and technologies disclosed herein, the shape memory alloy weapon fairing 102 can be formed into the deployed shape shown in FIGS. 4A and 4B via various processes and/or operations. After obtaining the deployed shape of the shape memory alloy weapon fairing 102, the shape memory alloy weapon fairing 102 can be manipulated to a pre-deployment shape such as the shape of the blank 200 illustrated in FIG. 2. According to some embodiments, the pre-deployment shape of the shape memory alloy weapon fairing 102 approximates the shape of the skin of the weapon 100 and/or another surface, structure, or portion of a surface of structure of the weapon 100. As such, the shape memory alloy weapon fairing 102 can be attached or connected to the weapon 100 in a pre-deployed shape.

It can be appreciated that during operation of the weapon 100, heat generated by the weapon and/or by friction between the weapon 100 and the air, for example, can heat the shape memory alloy weapon fairing 102 to a transition temperature associated with the shape memory alloy weapon fairing 102. As such, the shape memory alloy weapon fairing 102 can be transitioned from the pre-deployment shape to the deployed shape without machinery, moving parts, power supplies, and/or other components.

In one contemplated embodiment, the shape memory alloy weapon fairing 102 transitions from a pre-deployment configuration to a deployed configuration within one to two seconds of launch due to heat generated by exhaust of the weapon and/or by air friction. In some embodiments, the transition temperature of the shape memory alloy weapon fairing 102 is between one hundred and eight hundred degrees Celsius, depending upon the particular material used to form the shape memory alloy weapon fairing 102. As noted above, the transition temperature associated with the shape memory alloy weapon fairing 102, and therefore the transition time associated with the shape memory alloy weapon fairing 102 can be varied widely by varying the material used to form the shape memory alloy weapon fairing 102.

In some embodiments, the material used to form the shape memory alloy weapon fairing 102 is chosen based upon anticipated operating temperatures and/or temperature ranges associated with the shape memory alloy weapon fairing 102. For example, if a weapon 100 is to be deployed on an aircraft in a desert environment, the material used to form the shape memory alloy weapon fairing 102 may be chosen to provide a higher transition temperature as extremely high temperatures can be experienced by aircraft parked on desert-based tarmacs and/or in vicinity of other aircraft exhaust sources, and the like. It should be understood that this embodiment is illustrative, and should not be construed as being limiting in any way.

Similarly, the material used to form the shape memory alloy weapon fairing 102 can be varied to lower the transition temperature of the shape memory alloy weapon fairing 102 in cold environments, if desired. As such, the shape memory alloy weapon fairing 102 can be configured to transition from martensite to austenite at relatively low temperatures relative to shape memory alloy weapon fairing 102 deployed in desert or other high-temperature environments. In one embodiment, the shape memory alloy weapon fairing 102 begins to transition at seventy degrees Celsius and finished transitioning at ninety degrees Celsius. It should be understood that this embodiment is illustrative, and should not be construed as being limiting in any way. These and other aspects of the material chosen for the shape memory alloy weapon fairing 102 can be selected based on a variety of design constraints, and are not described in further detail herein.

The shape memory alloy weapon fairing 102 can be attached or connected to the weapon 100 using a variety of materials and/or mechanisms. For example, the shape memory alloy weapon fairing 102 can be connected to the weapon 100 using mechanical mechanisms such as rivets, clamps, screws, and the like. Additionally, or alternatively, the shape memory alloy weapon fairing 102 can be connected to the weapon 100 using chemical adhesives. Still further, various welding, laser welding, and/or other attachment processes can be used to connect the shape memory alloy weapon fairing 102 to the weapon 100.

In some embodiments, the shape memory alloy weapon fairing 102 is attached to the weapon 100 via a fixed attachment, whereby the shape memory alloy weapon fairing 102 is bonded directly to the skin of the weapon 100. In other embodiments, the shape memory alloy weapon fairing 102 is attached to the weapon 100 via a sliding or rotating attachment. As such, the shape memory alloy weapon fairing 102 can slide out from under the skin of the weapon 100 or rotate relative to the skin of the weapon 100. It should be understood that various mechanical structures may be included or required to rotate or slide the shape memory alloy weapon fairing 102 relative to the skin of the weapon 100. These structures, however, are not illustrated or described herein in detail. In yet other embodiments, a combination of fixed and sliding/rotating attachments are used. For example, a leading edge of the shape memory alloy weapon fairing 102 can be attached to the skin of the weapon 100, and the side edges and the trailing edge can be joined to the weapon 100 with a sliding or rotating attachment.

In some implementations, adhesives are used to join the shape memory alloy weapon fairing 102 to the weapon 100. For example, the skin of the weapon 100 can be treated via a laser surface treatment, thereby improving an epoxy bond to NiTi by about ten percent. In other implementations, ultrasonic soldering is used to provide a simple, low cost, and effective method of joining the shape memory alloy weapon fairing 102 to the weapon 100. In yet other embodiments, laser welding is used to weld the shape memory alloy weapon fairing 102 to the weapon 100. In yet other embodiments, successive layers of metal tape are bonded to the shape memory alloy weapon fairing 102 to bond the shape memory alloy weapon fairing 102 to the weapon 100 using a low temperature process. It should be understood that the above connection processes and materials are illustrative, and should not be construed as being limiting in any way.

Although the above description illustrates and describes embodiments of the concepts and technologies disclosed herein with respect to one-way transformations of the shape memory alloy weapon fairing 102, it should be understood that the concepts and technologies disclosed herein are not so limited. In particular, various implementations of the concepts and technologies disclosed herein include two-way transformations of the shape memory alloy weapon fairing 102. In some implementations, two-way transformations of the shape memory alloy weapon fairing 102 are used to provide two-way changes to the shape memory alloy weapon fairing 102. Two-way transformations of shape memory alloys are generally understood and will therefore not be explained herein in further detail.

Figure 5:
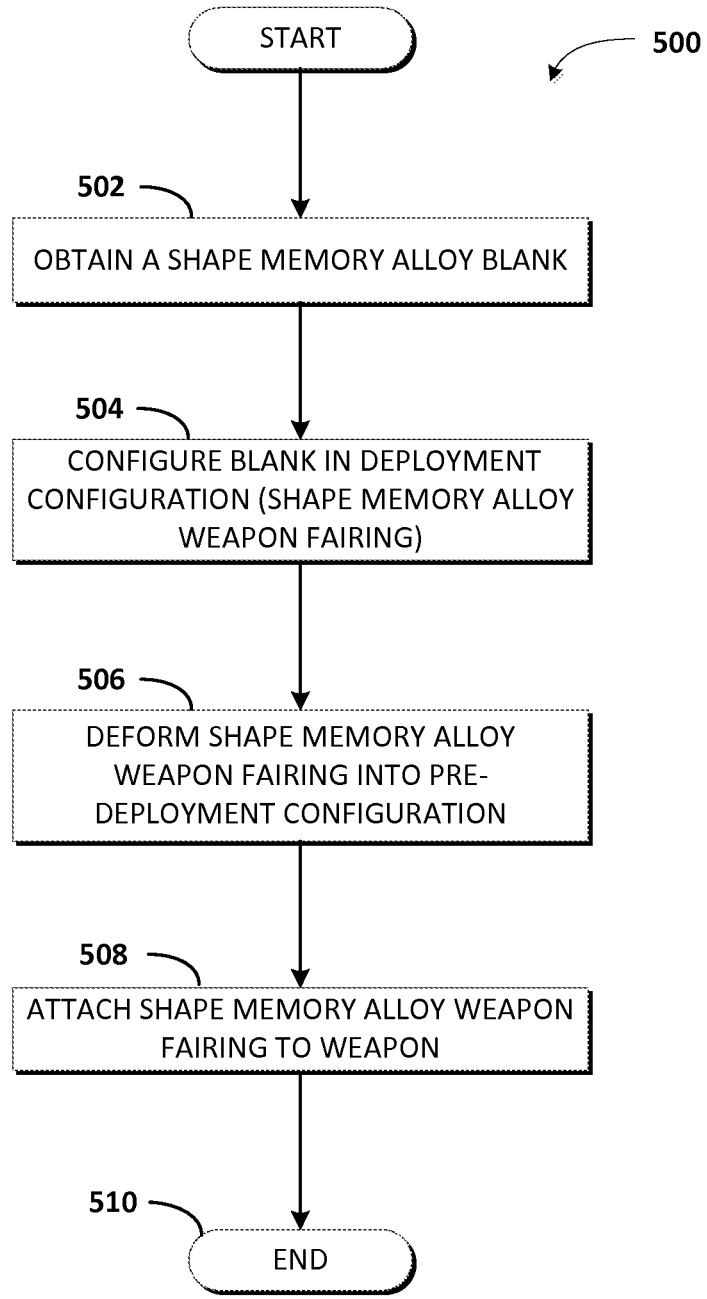
FIG. 5 is a flow diagram illustrating aspects of a method for determining position of a structure, according to an illustrative embodiment.

Turning now to FIG. 5, aspects of a method 500 for forming a shape memory alloy weapon fairing will be described in detail, according to an illustrative embodiment. It should be understood that the operations of the method 500 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims. It also should be understood that the illustrated method 500 can be ended at any time and need not be performed in their respective entireties.

The method 500 begins at operation 502, wherein a blank 200 is obtained. As described above with reference to FIGS. 2A-3, the blank 200 can be obtained from a sheet of material. For example, a blank 200 can be stamped out of a sheet of material using a die cut process or other suitable process. As such, obtaining the blank 200 can include forming the apertures 204 and/or various edges of the blank 200 as illustrated and described above.

From operation 502, the method 500 proceeds to operation 504, wherein the blank 200 is configured in the deployed configuration, i.e., the shape memory alloy weapon fairing 102. As described above, the shape memory alloy weapon fairing 102 can be obtained via performing various processes on the blank 200. For example, the blank 200 can be formed into the shape memory alloy weapon fairing 102 using a forming process using a tool and die set such as the tool and die set 300 illustrated in FIG. 3. Additionally, or alternatively, the shape memory alloy weapon fairing 102 can be obtained via performance of various heat treatments, machining processes, combinations thereof, and the like.

From operation 504, the method 500 proceeds to operation 506, wherein the shape memory alloy weapon fairing 102 is deformed to obtain the pre-deployment configuration. As explained herein, the shape memory alloy weapon fairing 102 can be hammered, stamped, pressed, and/or otherwise deformed from the deployed shape to the pre-deployment shape. As such, the operation 506 can include various mechanical and/or other processes for deforming the shape memory alloy weapon fairing 102.

From operation 506, the method 500 proceeds to operation 508, wherein the shape memory alloy weapon fairing 102 is attached or connected to the weapon 100. As explained at length above, the shape memory alloy weapon fairing 102 can be attached to the weapon 100 using a variety of mechanical or chemical adhesives or connectors such as epoxies or other resins, welding or other thermal bonding processes, straps or other mechanical connectors, and/or other mechanisms. The determination as to how the shape memory alloy weapon fairing 102 is connected to the weapon 100 can be a matter of design choice, and as such, can be chosen based upon any number of considerations including, but not limited to, an environment in which the weapon 100 is to be used, space availability or restrictions at the skin of the weapon 100, and the like.

Although not illustrated in FIG. 5, it should be understood that after the shape memory alloy weapon fairing 102 is attached or connected to the weapon 100, that the weapon 100 can be delivered for use. In various embodiments, the weapon 100 is delivered to an appropriate facility for connection to an aircraft or other structure. The weapon 100 can be deployed by the aircraft or another suitable structure, as is known.

From operation 508, the method 500 proceeds to operation 510. The method 500 ends at operation 510.

Based on the foregoing, it should be appreciated that concepts and technologies for shape memory alloy weapon fairings are provided herein. Although the subject matter presented herein has been described in language specific to structural features and methodological acts, it is to be understood that the invention defined in the appended claims is not necessarily limited to the specific features or acts described herein. Rather, the specific features and acts are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. An airborne structure for use with a connection mechanism to connect the airborne structure to a vehicle, the airborne structure comprising:
   a support surface between opposing ends of the airborne structure and adjacent the connection mechanism; and
   a shape memory alloy fairing disposed adjacent to the support surface, the shape memory alloy fairing having a first shape at a first temperature conforming to the support surface and a second shape protruding perpendicular to the airflow at a second temperature that diverts airflow around the connection mechanism thereby reducing drag associated with the connection mechanism.

2. The airborne structure of claim 1, wherein the shape memory alloy fairing is formed from a shape memory alloy.

3. The airborne structure of claim 2, wherein the shape memory alloy comprises nitinol.

4. The airborne structure of claim 3, wherein the nitinol comprises binary nitinol.

5. The airborne structure of claim 4, wherein the binary nitinol comprises about fifty five percent by weight nickel.

6. The airborne structure of claim 4, wherein the second temperature is a transition temperature.

7. The airborne structure of claim 1, wherein the shape memory alloy fairing is attached to the support surface with a chemical adhesive.

8. The airborne structure of claim 1, wherein the shape memory alloy fairing is mechanically connected to the support surface.

9. The airborne structure of claim 1, wherein the shape memory alloy fairing is thermally bonded to the support surface.

10. The airborne structure of claim 1, wherein the airborne structure comprises a missile, and wherein the missile is configured for attachment to an aircraft.

11. A shape memory alloy weapon fairing for a connection mechanism to connect a weapon to a vehicle, the shape memory alloy weapon fairing comprising:
   a first shape at a first temperature exposing the connection mechanism to airflow and a second shape protruding from the weapon perpendicular to the airflow at a second temperature that diverts airflow around the connection mechanism thereby reducing drag associated with the connection mechanism.

12. The shape memory alloy weapon fairing of claim 11, wherein the shape memory alloy weapon fairing is formed from binary nitinol.

13. The shape memory alloy weapon fairing of claim 11, wherein the second temperature is a transition temperature, and wherein the transition temperature comprises a temperature within a range of about seventy degrees Celsius to about ninety degrees Celsius.

14. The shape memory alloy weapon fairing of claim 11, wherein the weapon comprises a missile.

15. A method for forming a shape memory alloy weapon fairing for a weapon, the method comprising:
   providing a shape memory alloy blank;
   deforming the blank into a pre-deployment configuration of the shape memory alloy weapon fairing;
   deforming the pre-deployment configuration to obtain a deployment configuration of the shape memory alloy weapon fairing protruding from the weapon perpendicular to the airflow;
   conforming the shape memory alloy weapon fairing to a weapon in the pre-deployment configuration;
   transitioning the shape memory alloy fairing into the deployment configuration; and
   in response to the transitioning step, diverting air around a connection mechanism coupled to the weapon.

16. The method of claim 15, wherein the shape memory alloy weapon fairing blank is configured to provide a fairing for an attachment mechanism of the weapon when the shape memory alloy weapon fairing blank is heated to a transition temperature.

17. The method of claim 15, wherein deforming the shape memory alloy weapon fairing blank into the pre-deployment configuration comprises deforming the shape memory alloy weapon fairing blank using a tool and die.

18. The method of claim 17, wherein deforming the shape memory alloy weapon fairing blank into the pre-deployment configuration further comprises heat-treating the shape memory allow weapon fairing.

19. The method of claim 15, wherein the shape memory alloy weapon fairing is formed from a shape memory alloy.

20. A method for deploying an airborne structure with an aircraft, comprising:
   providing a pre-deformed shape memory alloy fairing having a first shape;
   conforming the shape memory alloy fairing to the exterior body and between opposing ends of the airborne structure;
   connecting the airborne structure to the aircraft with a connection mechanism while the shape memory alloy fairing is in the first shape; and
   transitioning the shape memory allow fairing into a second shape to divert airflow around the connection mechanism protruding perpendicular to the airflow such that drag is reduced while the aircraft is airborne.

* * * * *